United States Patent Office 3,453,223
Patented July 1, 1969

3,453,223
PROCESS FOR THE PREPARATION OF ACRYL-ONITRILE GRAFT COPOLYMERS
Carlhans Süling and Egon Kuntz, Leverkusen, Germany, assignors to Farbenfabriken Bayer Aktiengesellschaft, Leverkusen, Germany, a corporation of Germany
No Drawing. Filed Aug. 24, 1964, Ser. No. 391,744
Claims priority, application Germany, Sept. 11, 1963, F 40,728
Int. Cl. C08f 27/10, 15/40; C08b 21/24
U.S. Cl. 260—17                               14 Claims

ABSTRACT OF THE DISCLOSURE

There is disclosed a process for the production of graft polymers of acrylonitrile, masked polymerizable isocyanates and other unsaturated polymerizable monomers, by polymerizing acrylonitrile and unsaturated masked isocyanates and a copolymerizable vinyl or vinylidene compound in the presence of an aliphatically saturated alcohol having at least two primary or secondary alcoholic hydroxyl groups and a free radical forming polymerization catalyst.

The resulting polymers can be cross-linked by heat and do not undergo any yellowing.

This invention relates to graft polymers of acrylonitrile and masked, polymerizable isocyanates, any balance being another monoethylenically unsaturated monomer that is copolymerizable with acrylonitrile and a process for preparing them.

It is known that acrylonitrile can be copolymerized with masked, polymerisable isocyanates, and it has been proposed to build up copolymers from acrylonitrile, an unsaturated, polymerisable, masked isocyanate and another monomer which contains active hydrogen atoms. Acrylamide, methacrylamide, acrylic acid, methacrylic acid or acid esters of maleic or of fumaric acid have been mentioned as monomers with active hydrogen atoms for these ternary copolymers. These polymers containing carboxyl groups have, however, the disadvantage as raw material for fibres that the cross-linking reaction takes place with evolution of $CO_2$.

In dry spinning, for example, a cross-linking reaction during the spinning process, and hence the evolution of gas, takes place in the spinneret and gives rise to tears in the filaments. If cross-linking is carried out after the shaping process, gas bubbles occur in the fibres or films and leaves them with a very irregular structure.

On the other hand, the use of acrylamide or methacrylamide as cocomponent for the cross-linking via active hydrogen atoms has the disadvantage that these carbonamides only react with masked isocyanate groups at relatively high temperatures, and, if acrylonitrile polymers are heated for prolonged periods at temperatures above 170° C., they undergo yellowing. Fibres or filaments with a yellow discoloration cannot be used for textile purposes.

In particular, therefore this invention relates to a method for the preparation of acrylonitrile polymers which can be cross-linked by heat, especially fibre-forming acrylonitrile polymers of this kind, from (a) acrylonitrile, (b) unsaturated, masked, polymerizable isocyanates, and (c) other copolymerizable vinyl- and/or vinylidene compounds which are free from COOH— and primary and secondary amino groups, which comprises polymerizing these monomers in the presence of an aliphatically saturated compound with contains at least two primary or secondary alcoholic hydroxy groups. Aliphatically saturated compounds as mentioned above are compounds in which the aliphatic part of the molecule is free from carbon-carbon double bonds.

In this method, the above-mentioned monomers undergo graft copolymerization with the above defined polyhydroxy compounds which serve as graft substrate. Graft copolymerization of acrylonitrile is known per se (see Houben-Weyl: "Methoden der organischen Chemie," vol. 14/1, page 400). The use of mixtures of various monomers in such a graft polymerization does not in itself give rise to special difficulties provided:

(1) The quantity of monomers to be used besides the acrylonitrile does not exceed 20 to 12%, depending upon the type of monomer, calculated on the quantity of acrylonitrile used, (2) These monomers which are used in addition to acrylonitrile have similar polymerization activities to acrylonitrile, and (3) These additionally used monomers do not carry any substituents which could react with the graft substrate.

The condition (3) is not fulfilled in the process according to the invention, since masked isocyanates react with primary and secondary hydroxy groups. It was not, therefore, to be expected that graft copolymers according to the invention would give highly concentrated gel-free solutions from which fibres having very good textile properties could be obtained by dry or wet spinning.

A specially advantageous method of carrying out the present process, which above all leads to specially advantageous fibre-forming graft copolymers of acrylonitrile, consists in that (a) the proportion of acrylonitrile in the graft monomer mixture is at least 80%, (b) the quantity of masked, polymerizable isocyanate is from 0.1 to 5% (calculated on the graft monomer mixture), and (c) the remainder of the graft monomer mixture is provided by the above defined vinyl and/or vinylidene monomers.

The ratio between graft monomer mixture and graft substrate has a lower limit in that at least 1% of polyhydroxyl compound serving as graft substrate should be used. On the other hand, the polyhydroxyl compound can be used in any desired excess over the graft monomer mixture both in order to obtain an adequate degree of grafting and to make available sufficient hydroxyl functions for the cross-linking reaction, all according to the hydroxyl group content of the graft substrate. Suitable for use as masked, polymerizable isocyanates are addition compounds of unsaturated, polymerizable isocyanates, such as isocyanates of acrylic acid esters, allyl ether isocyanates, styryl isocyanate or vinyl isocyanate with phenols, tertiary alcohols, hydrocyanic acid, alkali metal bisulphites or with compounds having activated methylene groups, for example diethyl malonate or ethyl acetoacetate. Such adducts have the characteristic that they split up already at temperatures below 200° C. to form reactive isocyanate groups. Examples include the reaction product of β-isocyanatoethyl methacrylate and tertiary butanol, the addition product of β-isocyanatoethyl methacrylate and phenol, the addition product of β-isocyanatoethyl methacrylate and ethyl acetoacetate and the addition product of β-isocyanatoethyl methacrylate and sodium bisulphate.

Especially suitable as copolymerizable vinyl and/or vinylidene compounds which are free from carboxyl groups and primary and secondary amino groups are a number of monomers which are particularly useful if the graft copolymer of acrylonitrile according to the invention is to be used as a raw material for fibers. For example, textile fibres must have a minimum affinity for basic or acid dyestuffs. To achieve this, additional co-monomers such as vinyl pyridine or β-dimethylaminoethyl acrylate are used. In addition, the salts of unsaturated, polymerizable sulphonic acids, e.g., the alkali metal salts of styrene sulphonic acid or of unsaturated, polymerizable disulphonimides may be used as cocomponents which have an affinity for dyestuffs. Further, it may be advantageous to use, as further comonomers, monomers which have a favorable effect on the behavior of the copolymer during the spinning process. Such comonomers are alkyl acrylates such as methyl acrylate and butyl acrylate or alkyl methacrylates such as methyl methacrylate and ethyl methacrylate or comonomers such as styrene, vinyl acetate or vinyl propionate. The copolymer should, however, consist predominately of bound acrylonitrile. Only then are such copolymers suitable raw materials for high grade acrylic fibers.

Suitable as graft substrates are aliphatically saturated compounds which are soluble or emulsifiable in water and which contain at least two primary or secondary alcoholic hydroxy groups, for example aliphatic, saturated di- or polyhydric primary or secondary alcohols, mainly those that are only slightly branched such as glycol, glycerol, butanediols, pentanediols, polyalkylene glycols, e.g., diethyleneglycol, triethyleneglycol or dipropyleneglycol, sugar alcohols, such as sorbital and related substances. Of particular interest in connection with the process of the present invention are high molecular polyhydroxy compounds, such as polyvinyl alcohol, partially saponified polyvinyl esters, such as polyvinyl acetate, cellulose methyl ether, maize starch or starch methyl ether. Saponified or partially saponified copolymers of vinyl esters, such as those of vinyl acetate or of vinyl propionate with styrene, vinyl chloride, ethylene or acrylonitrile, are also suitable as graft substrates.

The graft copolymerization may be carried out in solution, emulsion or suspension or as precipitation polymerization. The known polymerization starters which yield radicals are suitable for initiating polymerization and are employed in the usual quantities of 0.1 to 3% calculated on the total quantity of monomer, e.g., such hydroperoxides as cumene hydroperoxide or such cyclohexane peroxides as 1:1′-dihydroxy-dicyclohexyl peroxide. Diacyl peroxides such as diacetyl peroxide, dilauryl peroxide, dibenzoyl peroxide and substituted dibenzoyl peroxides are also suitable. Aliphatic azo compounds such as azodiisobutyronitrile are also suitable polymerization starters. In a preferred embodiment of the process, the graft copolymerization is initiated by means of a Redox system, if desired with addition of small quantities of a heavy metal compound. It has proved especially advantageous to carry out the graft copolymerization as a precipitation polymerization, using a Redox system based on persulphates or chlorates and water-soluble compounds of tetravalent sulphur as initiator system. Suitable water-soluble compounds of tetravalent sulphur are, for example, $SO_2$, alkali metal bisulphites, sodium metabisulphite, alkali metal thiosulphates, sulphinic acids or formaldehyde sulphoxylates of alkali metals. Especially simple graft copolymers which can be used as raw materials for fibres are obtained by this last-mentioned method. In this connection it has been found advantageous to employ such concentrtaions of oxidizing and reducing components in the Redox system that there is an excess of reducing components present in the polymerization reaction mixture.

The polymerization temperature is generally from 20 to 100° C. (preferably 35 to 70° C.).

Especially pale fibres or films are obtained by carrying out the polymerization at pH values below 8, preferably at pH 4 to 3. The pH may be adjusted by the addition of inorganic or organic acids, such as sulphuric acid, hydrochloric acid, nitric acid, orthophosphoric acid, pyrophosphoric acid, metaphosphoric acid, acetic acid, benzoic acid, chlorinated acetic acid or oxalic acid. The use of emulsifiers or dispersing agents is frequently of advantage if the graft substrate is only moderately soluble in water. Suitable emulsifiers are the usual anionic or cationic emulsifiers or such neutral emulsifiers as polyalkylene oxides.

When very high molecular graft substrates are used, it may be advantageous to carry out the polymerization in the presence of regulators, such as long chain alkyl mercaptans ($C_{12}$–$C_{14}$) or thioglycol, in order to obtain graft copolymers which can be used as raw materials for fibres.

The polymers are cross-linked after they have been shaped, by simple heating of the shaped articles (fibres, filaments, foils or films) at temperatures of 80 to 160° C., preferably 100 to 150° C. It is certainly known that graft copolymers of acrylonitrile which are obtained by grafting acrylonitrile on polyvinyl alcohol can be cross-linked with formaldehyde, but the process according to the invention provides graft copolymers which can be cross-linked by a simple heat treatment within the above mentioned temperature range. The occurrence of bubbles in the fibres, with the disadvantages which this involves, is avoided by this thermal cross-linking reaction.

In the examples given below, the parts by weight are related to the parts by volume as gram to cubic centimetre.

EXAMPLE 1

100 parts by volume of water, 0.2 part by volume of N-sulphuric acid and 2 parts by weight of polyvinyl alcohol, of a molecular weight of about 30,000, are placed in a polymerization vessel. The vessel is flushed with nitrogen and the temperature is adjusted to 55° C. Solutions I, II and III are then added simultaneously at 55° C. to the stirred reaction mixture within four hours.

Solution I 300 parts by volume of water,
0.9 part by weight of sodium pyrosulphite,
0.3 part by weight of sodium styrene sulphonate.

Solution II 300 parts by volume of water,
0.7 part by volume of N-sulphuric acid,
0.6 part by weight of potassium persulphate.

Solution III 106 parts by weight of acrylonitrile,
2.0 parts by weight of the reaction product of β-isocyanatoethyl methacrylate and tertiary butanol.

Shortly after beginning the addition of Solutions I, II and III to the reaction components, the graft copolymer separates as a white, granular precipitate which can be filtered. When polymerization is completed, the precipitate is separated by suction filtered and dried at 50° C. It is a white powder which cannot be melted and has a K-value of 86. The graft copolymer is soluble, in dimethyl formamide, forming a clear solution. Films which are obtained from dimethyl formamide solutions of the graft copolymer are insoluble in dimethyl formamide, dimethyl sulphoxide and dimethyl acetamide after a treatment at 130° C.

EXAMPLE 2

The procedure is the same as in Example 1 but 4 parts by weight instead of 2 parts by weight of polyvinyl alcohol are used. A yield of 101 parts by weight of a graft copolymer of K-value 84 is obtained, the solutions of which can be worked up into films which are insoluble in dimethyl formamide after heating at 130° C.

EXAMPLE 3

150 parts by volume of water, 0.2 part by volume of N-phosphoric acid and 1 part by weight of polyvinyl alcohol of molecular weight of about 90,000 are placed in a polymerization vessel. The vessel is flushed with nitrogen and the temperature is adjusted to 45° C. Solutions I, II and III heated to 40° C. are then added simultaneously to the stirred reaction mixture within 3 hours.

Solution I 400 parts by volume of water,
1.0 part by weight of sodium pyrosulphite,
0.3 part by weight of sodium styrene sulphonate.

Solution II 400 parts by volume of water,
5.0 parts by volume of N-phosphoric acid,
0.6 part by weight of potassium persulfate.

Solution III 106 parts by weight of acrylonitrile,
2.0 parts by weight of the addition product of β-isocyanatoethyl methacrylate and phenol A few minutes after the onset of polymerization, the graft copolymer begins to separate in the form of a white, finely granular precipitate. After the reaction is completed the reaction mixture is stirred for one further hour at 50° C. and the graft copolymer is then filtered off and dried in vacuo at 40° C. 100 parts by weight of a white powder which cannot be melted and has a K-value of 92 are obtained. The graft copolymer is soluble in dimethyl formamide. Films of the product are insoluble in dimethyl formamide after treatment at 140° C.

EXAMPLE 4

100 parts by volume of water, 0.2 part by volume of N-sulphuric acid and 1 part by weight of sorbitol are placed in a polymerization vessel. It is flushed with nitrogen and the temperature is adjusted to 55° C. Solutions I, II and III are then added simultaneously at 55° C. to the stirred reaction mixture within 3 hours.

Solution I 300 parts by volume of water,
0.9 part by weight of sodium pyrosulphite.

Solution II 300 parts by volume of water,
6.0 parts by volume of N-sulphuric acid,
0.6 part by weight of potassium persulphate.

Solution III 100 parts by weight of acrylonitrile,
6 parts by weight of methyl acrylate,
1.5 parts by weight of the addition product of β-isocyanatoethyl methacrylate and ethyl acetoacetate.

After a short time, the graft copolymer separates from the reaction medium in the form of a white granular precipitate which is filtered off after the reaction is completed, and dried at 50° C. 83 parts by weight of a graft copolymer, which can be cross-linked by heating at 125 to 135° C., are obtained.

EXAMPLE 5

The procedure is the same as in Example 4 except that the addition product of β-isocyanatoethyl methacrylate and sodium bisulphate is used instead of the addition product of β-isocyantoethyl methacrylate and phenol. Since the masked isocyanate used in this example is soluble in water, it is added separately in aqueous solution to the polymerization component. 101 parts by weight of a graft copolymer which can be cross-linked by heating at 135° C. are obtained.

EXAMPLE 6

The procedure is the same as in Example 4 except that, instead of sorbitol, an equal quantity of hydroxy methyl cellulose is used as graft substrate. 85 parts by weight of a white graft copolymer, which can be cross-linked by heat treatment, are obtained.

What we claim is:

1. An acrylonitrile graft polymer containing as graft substrate at least 1% by weight of a member selected from the group consisting of a polyvinyl alcohol, a partially saponified polyvinyl acetate and hydroxy methyl cellulose and having grafted thereon (a) at least 80% by weight referred to the graft monomer mixture of acrylonitrile, (b) 0.1 to 5% by weight referred to the graft monomer mixture of a masked polymerizable ethylenically unsaturated isocyanate, and (c) an ethylenically unsaturated copolymerizable compound selected from the group consisting of vinyl componds, vinylidene compounds and mixtures thereof which compounds are free of carboxyl groups and primary and secondary amino groups constituting the remainder of said graft monomer mixture.

2. A process for the production of acrylonitrile graft polymers which comprises graft polymerizing a predominant portion of (a) acrylonitrile, (b) an unsaturated, masked, polymerizable isocyanate and (c) an ethylenically unsaturated copolymerizable compound selected from the group consisting of vinyl compounds, vinylidene compounds and mixtures thereof which compounds are free of carboxyl groups and primary and secondary amino groups, onto a graft substrate selected from the group consisting of polyvinyl alcohols, partially saponified polyvinyl acetate and hydroxy methyl cellulose, effecting said polymerization in an aqueous medium and in the presence of a free radical forming polymerization catalyst.

3. A process according to claim 2 wherein said graft polymerization is effected in solution in a solvent for polyacrylonitrile.

4. The process of claim 2, wherein said acrylonitrile is present in a quantity of at least about 80 percent by weight of the total monomer content.

5. The process of claim 2, wherein said unsaturated, masked, polymerizable isocyanate comprises the reaction product of β-isocyanatoethylmethacrylate and tert. butanol.

6. The process of claim 2, wherein said unsaturated, masked, polymerizable isocyanate comprises the reaction product of β-isocyantoethylmethacrylate and phenol.

7. The process of claim 2, wherein said graft substrate is polyvinylalcohol.

8. The process of claim 2, wherein said graft substrate is hydroxy methyl cellulose.

9. The process of claim 2, wherein a redox system based on (a) a persulphate and (b) a water-soluble compound of tetravalent sulphur is used as polymerization initiator.

10. The process of claim 2 wherein the qantity of masked polymerizable isocyanate present amounts to from 0.1–5% referred to the total monomer content.

11. The process of claim 2 wherein said graft substrate is present in an amount of at least 1%.

12. The process of claim 2 wherein said polymerization initiator is present in an amount of 0.1 to 3% referred to the total monomer content.

13. The process of claim 2 wherein said polymerization is carried out at a temperature of from 20–100° C.

14. The process of claim 2 wherein said polymerization is carried out at a pH value of less than 8.

References Cited

UNITED STATES PATENTS

| | | | |
|---|---|---|---|
| 3,342,780 | 9/1967 | Mezer et al. | 260—75 |
| 2,718,516 | 9/1955 | Bortnick | 260—859 |
| 3,211,585 | 10/1965 | Mezer et al. | 260—75 |

WILLIAM H. SHORT, *Primary Examiner.*

E. NIELSEN, *Assistant Examiner.*

U.S. Cl. X.R.

260—881, 882